United States Patent
Koenning et al.

(10) Patent No.: US 10,122,630 B1
(45) Date of Patent: Nov. 6, 2018

(54) METHODS FOR NETWORK TRAFFIC PRESTEERING AND DEVICES THEREOF

(71) Applicant: F5 Networks, Inc., Seattle, WA (US)

(72) Inventors: Christian Koenning, Egham (DE); Ian Smith, Middletown, NY (US); David Hansen, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 260 days.

(21) Appl. No.: 14/824,549

(22) Filed: Aug. 12, 2015

Related U.S. Application Data

(60) Provisional application No. 62/037,935, filed on Aug. 15, 2014.

(51) Int. Cl.
*H04L 12/741* (2013.01)
*H04L 29/12* (2006.01)
*H04L 12/725* (2013.01)

(52) U.S. Cl.
CPC .......... *H04L 45/745* (2013.01); *H04L 45/306* (2013.01); *H04L 61/1511* (2013.01); *H04L 61/2007* (2013.01)

(58) Field of Classification Search
CPC . H04L 45/745; H04L 45/306; H04L 61/1511; H04L 61/2007
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,897,781 A | 1/1990 | Chang et al. |
| 4,965,772 A | 10/1990 | Daniel et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

"A Process for Selective Routing of Servlet Content to Transcoding Modules," Research Disclosure 422124, Jun. 1999, pp. 889-890, IBM Corporation.

(Continued)

*Primary Examiner* — Wing F Chan
*Assistant Examiner* — Billy H Ng
(74) *Attorney, Agent, or Firm* — LeClairRyan PLLC

(57) ABSTRACT

Methods, non-transitory computer readable media, and traffic manager computing devices that forward a request to resolve a domain name from a client device to a Domain Name System (DNS) server device and a response from the DNS server device including an original Internet Protocol (IP) address corresponding to the domain name to the client device. Content is retrieved from a location associated with the domain name in response to a request for the content received from the client device. Classification information comprising at least a type of the retrieved content is determined. The retrieved content is sent to the client device in response to the request for the content. A determination is made when a confidence threshold has been exceeded based on the classification information. A steering endpoint IP address is sent to the DNS server device, when the determining indicates that the confidence threshold has been exceeded.

20 Claims, 6 Drawing Sheets

(56) References Cited

U.S. PATENT DOCUMENTS

| | | |
|---|---|---|
| 5,023,826 A | 6/1991 | Patel |
| 5,053,953 A | 10/1991 | Patel |
| 5,167,024 A | 11/1992 | Smith et al. |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,832,283 A | 11/1998 | Chou et al. |
| 5,875,296 A | 2/1999 | Shi et al. |
| 5,892,914 A | 4/1999 | Pitts |
| 5,892,932 A | 4/1999 | Kim |
| 5,898,876 A | 4/1999 | James |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,160,874 A | 12/2000 | Dickerman et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,249,801 B1 | 6/2001 | Zisapel et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,618 B1 | 8/2002 | Cohen et al. |
| 6,434,801 B2 | 8/2002 | Johnson et al. |
| 6,480,476 B1 | 11/2002 | Willars |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,661,802 B1 | 12/2003 | Homberg et al. |
| 6,683,873 B1 | 1/2004 | Kwok et al. |
| 6,691,165 B1 | 2/2004 | Bruck et al. |
| 6,694,517 B1 | 2/2004 | James et al. |
| 6,708,187 B1 | 3/2004 | Shanumgam et al. |
| 6,718,380 B1 | 4/2004 | Mohaban et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,804,542 B1 | 10/2004 | Haartsen |
| 6,816,901 B1 | 11/2004 | Sitaraman et al. |
| 6,816,977 B2 | 11/2004 | Brakmo et al. |
| 6,826,698 B1 | 11/2004 | Minkin et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,947,985 B2 | 9/2005 | Hegli et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,959,394 B1 | 10/2005 | Brickell et al. |
| 6,975,592 B1 | 12/2005 | Seddigh et al. |
| 6,986,040 B1 | 1/2006 | Kramer et al. |
| 6,987,763 B2 | 1/2006 | Rochberger et al. |
| 7,007,092 B2 | 2/2006 | Peiffer |
| 7,058,633 B1 | 6/2006 | Gnagy et al. |
| 7,113,993 B1 | 9/2006 | Cappiello et al. |
| 7,133,944 B2 | 11/2006 | Song et al. |
| 7,139,792 B1 | 11/2006 | Mishra et al. |
| 7,185,359 B2 | 2/2007 | Schmidt et al. |
| 7,228,422 B2 | 6/2007 | Morioka et al. |
| 7,287,082 B1 | 10/2007 | O'Toole, Jr. |
| 7,295,827 B2 | 11/2007 | Liu et al. |
| 7,308,703 B2 | 12/2007 | Wright et al. |
| 7,308,709 B1 | 12/2007 | Brezak et al. |
| 7,310,339 B1 | 12/2007 | Powers et al. |
| 7,319,696 B2 | 1/2008 | Inoue et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,383,570 B2 | 6/2008 | Pinkas et al. |
| 7,398,552 B2 | 7/2008 | Pardee et al. |
| 7,433,962 B2 | 10/2008 | Janssen et al. |
| 7,437,478 B2 | 10/2008 | Yokota et al. |
| 7,454,480 B2 | 11/2008 | Labio et al. |
| 7,490,162 B1 | 2/2009 | Masters |
| 7,500,243 B2 | 3/2009 | Huetsch et al. |
| 7,500,269 B2 | 3/2009 | Huotari et al. |
| 7,505,795 B1 | 3/2009 | Lim et al. |
| 7,516,492 B1 | 4/2009 | Nisbet et al. |
| 7,522,581 B2 | 4/2009 | Acharya et al. |
| 7,526,541 B2 | 4/2009 | Roese et al. |
| 7,558,197 B1 | 7/2009 | Sindhu et al. |
| 7,580,971 B1 | 8/2009 | Gollapudi et al. |
| 7,590,732 B2 | 9/2009 | Rune |
| 7,624,424 B2 | 11/2009 | Morita et al. |
| 7,644,137 B2 | 1/2010 | Bozak et al. |

(56) References Cited

U.S. PATENT DOCUMENTS

| | | |
|---|---|---|
| 7,668,166 B1 | 2/2010 | Rekhter et al. |
| 7,689,710 B2 | 3/2010 | Tang et al. |
| 7,724,657 B2 | 5/2010 | Rao et al. |
| 7,725,093 B2 | 5/2010 | Sengupta et al. |
| 7,769,845 B2 | 8/2010 | Baron |
| 7,778,187 B2 | 8/2010 | Chaturvedi et al. |
| 7,801,978 B1 | 9/2010 | Susai et al. |
| 7,808,913 B2 | 10/2010 | Ansari et al. |
| 7,831,662 B2 | 11/2010 | Clark et al. |
| 7,908,314 B2 | 3/2011 | Yamaguchi et al. |
| 7,925,908 B2 | 4/2011 | Kim |
| 7,930,365 B2 | 4/2011 | Dixit et al. |
| 7,933,946 B2 | 4/2011 | Livshits et al. |
| 7,945,908 B1 | 5/2011 | Waldspurger et al. |
| 7,984,141 B2 | 7/2011 | Gupta et al. |
| 8,041,022 B1 | 10/2011 | Andreasen et al. |
| 8,103,781 B1 | 1/2012 | Wu et al. |
| 8,130,650 B2 | 3/2012 | Allen, Jr. et al. |
| 8,149,819 B2 | 4/2012 | Kobayashi et al. |
| 8,189,567 B2 | 5/2012 | Kavanagh et al. |
| 8,199,757 B2 | 6/2012 | Pani et al. |
| 8,205,246 B2 | 6/2012 | Shatzkamer et al. |
| 8,239,954 B2 | 8/2012 | Wobber et al. |
| 8,274,895 B2 | 9/2012 | Rahman et al. |
| 8,321,908 B2 | 11/2012 | Gai et al. |
| 8,351,333 B2 | 1/2013 | Rao et al. |
| 8,380,854 B2 | 2/2013 | Szabo |
| 8,417,817 B1 | 4/2013 | Jacobs |
| 8,447,871 B1 | 5/2013 | Szabo |
| 8,447,970 B2 | 5/2013 | Klein et al. |
| 8,452,876 B1 | 5/2013 | Williams et al. |
| 8,464,265 B2 | 6/2013 | Worley |
| 8,468,247 B1 | 6/2013 | Richardson et al. |
| 8,468,267 B2 | 6/2013 | Yigang |
| 8,521,851 B1 | 8/2013 | Richardson et al. |
| 8,521,880 B1 | 8/2013 | Richardson et al. |
| 8,359,224 B2 | 9/2013 | Henderson et al. |
| 8,566,474 B2 | 10/2013 | Kanode et al. |
| 8,578,050 B2 | 11/2013 | Craig et al. |
| 8,606,921 B2 | 12/2013 | Vasquez et al. |
| 8,615,022 B2 | 12/2013 | Harrison et al. |
| 8,646,067 B2 | 2/2014 | Agarwal et al. |
| 8,665,868 B2 | 3/2014 | Kay |
| 8,701,179 B1 | 4/2014 | Penno et al. |
| 8,725,836 B2 | 5/2014 | Lowery et al. |
| 8,726,338 B2 | 5/2014 | Narayanaswamy et al. |
| 8,737,304 B2 | 5/2014 | Karuturi et al. |
| 8,778,665 B2 | 7/2014 | Glide et al. |
| 8,804,504 B1 | 8/2014 | Chen |
| 8,819,109 B1 | 8/2014 | Krishnamurthy et al. |
| 8,819,419 B2 | 8/2014 | Carlson et al. |
| 8,830,874 B2 | 9/2014 | Cho et al. |
| 8,873,753 B2 | 10/2014 | Parker |
| 8,875,274 B2 | 10/2014 | Montemurro et al. |
| 8,886,981 B1 | 11/2014 | Baumann et al. |
| 8,908,545 B1 | 12/2014 | Chen et al. |
| 8,918,330 B1* | 12/2014 | Winkler ............. G06Q 30/0254 705/14.16 |
| 8,954,080 B2 | 2/2015 | Janakiraman et al. |
| 9,036,529 B2 | 5/2015 | Erickson et al. |
| 9,037,166 B2 | 5/2015 | de Wit et al. |
| 9,047,259 B1 | 6/2015 | Ho et al. |
| 9,077,554 B1 | 7/2015 | Szabo |
| 9,083,760 B1 | 7/2015 | Hughes et al. |
| 9,171,086 B1* | 10/2015 | Panda ............... G06F 17/30867 |
| 9,172,753 B1 | 10/2015 | Jiang et al. |
| 9,246,819 B1 | 1/2016 | Thirasuttakorn |
| 9,319,921 B2 | 4/2016 | Kuroda |
| 9,407,539 B1* | 8/2016 | Dickinson ............. H04L 45/306 |
| 2001/0009554 A1 | 7/2001 | Katseff et al. |
| 2001/0023442 A1 | 9/2001 | Masters |
| 2001/0052016 A1* | 12/2001 | Skene .................... G06F 9/505 709/226 |
| 2002/0010783 A1 | 1/2002 | Primak et al. |
| 2002/0027504 A1 | 3/2002 | Davis |
| 2002/0032777 A1 | 3/2002 | Kawata et al. |
| 2002/0046291 A1 | 4/2002 | O'Callaghan et al. |
| 2002/0049842 A1 | 4/2002 | Huetsch et al. |
| 2002/0059428 A1 | 5/2002 | Susai et al. |
| 2002/0083067 A1 | 6/2002 | Tamayo |
| 2002/0095498 A1 | 7/2002 | Chanda et al. |
| 2002/0112061 A1 | 8/2002 | Shih et al. |
| 2002/0138615 A1 | 9/2002 | Schmeling |
| 2002/0161913 A1 | 10/2002 | Gonzalez et al. |
| 2002/0194342 A1 | 12/2002 | Lu et al. |
| 2002/0198993 A1 | 12/2002 | Cudd et al. |
| 2003/0037070 A1 | 2/2003 | Marston |
| 2003/0046291 A1 | 3/2003 | Fascenda |
| 2003/0058839 A1 | 3/2003 | D'Souza |
| 2003/0065653 A1 | 4/2003 | Overton et al. |
| 2003/0065951 A1 | 4/2003 | Igeta et al. |
| 2003/0069918 A1 | 4/2003 | Lu et al. |
| 2003/0069974 A1 | 4/2003 | Lu et al. |
| 2003/0070069 A1 | 4/2003 | Belapurkar et al. |
| 2003/0086415 A1 | 5/2003 | Bernhard et al. |
| 2003/0105807 A1 | 6/2003 | Thompson et al. |
| 2003/0105983 A1 | 6/2003 | Brakmo et al. |
| 2003/0108052 A1 | 6/2003 | Inoue et al. |
| 2003/0120948 A1 | 6/2003 | Schmidt et al. |
| 2003/0128708 A1 | 7/2003 | Inoue et al. |
| 2003/0135509 A1* | 7/2003 | Davis .................. H04L 63/0227 |
| 2003/0145062 A1 | 7/2003 | Sharma et al. |
| 2003/0145233 A1 | 7/2003 | Poletto et al. |
| 2003/0163578 A1 | 8/2003 | Janssen et al. |
| 2003/0200311 A1 | 10/2003 | Baum |
| 2003/0208596 A1 | 11/2003 | Carolan et al. |
| 2003/0225485 A1 | 12/2003 | Fritz et al. |
| 2004/0003287 A1 | 1/2004 | Zissimopoulos et al. |
| 2004/0072569 A1 | 4/2004 | Omae et al. |
| 2004/0078487 A1* | 4/2004 | Cernohous ........ H04L 29/12009 709/245 |
| 2004/0103283 A1 | 5/2004 | Hornak |
| 2004/0111523 A1 | 6/2004 | Hall et al. |
| 2004/0111621 A1 | 6/2004 | Himberger et al. |
| 2004/0117493 A1 | 6/2004 | Bazot et al. |
| 2004/0148520 A1 | 7/2004 | Talpade et al. |
| 2004/0151186 A1 | 8/2004 | Akama |
| 2004/0190522 A1 | 9/2004 | Aerrabotu et al. |
| 2004/0268358 A1 | 9/2004 | Li et al. |
| 2004/0199762 A1 | 10/2004 | Carlson et al. |
| 2004/0210663 A1 | 10/2004 | Phillips et al. |
| 2004/0225713 A1 | 11/2004 | Abbasi et al. |
| 2004/0255000 A1 | 12/2004 | Simionescu et al. |
| 2004/0264472 A1 | 12/2004 | Oliver et al. |
| 2004/0264481 A1 | 12/2004 | Darling et al. |
| 2004/0267920 A1 | 12/2004 | Hydrie et al. |
| 2004/0267948 A1 | 12/2004 | Oliver et al. |
| 2005/0004887 A1 | 1/2005 | Igakura et al. |
| 2005/0021736 A1 | 1/2005 | Carusi et al. |
| 2005/0027869 A1 | 2/2005 | Johnson |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0071283 A1 | 3/2005 | Randle et al. |
| 2005/0078604 A1 | 4/2005 | Yim |
| 2005/0122942 A1 | 6/2005 | Rhee et al. |
| 2005/0122977 A1 | 6/2005 | Lieberman |
| 2005/0129001 A1 | 6/2005 | Backman et al. |
| 2005/0154837 A1 | 7/2005 | Keohane et al. |
| 2005/0187866 A1 | 8/2005 | Lee |
| 2005/0188220 A1 | 8/2005 | Nilsson et al. |
| 2005/0198310 A1 | 9/2005 | Kim et al. |
| 2005/0262238 A1 | 11/2005 | Reeves et al. |
| 2005/0288939 A1 | 12/2005 | Peled et al. |
| 2006/0002405 A1 | 1/2006 | Le Sauze et al. |
| 2006/0031520 A1 | 2/2006 | Bedekar et al. |
| 2006/0036764 A1 | 2/2006 | Yokota et al. |
| 2006/0059267 A1 | 3/2006 | Cugi et al. |
| 2006/0077902 A1 | 4/2006 | Kannan et al. |
| 2006/0077986 A1 | 4/2006 | Rune |
| 2006/0083205 A1 | 4/2006 | Buddhikot et al. |
| 2006/0095573 A1 | 5/2006 | Carle et al. |
| 2006/0106802 A1 | 5/2006 | Giblin et al. |
| 2006/0112176 A1 | 5/2006 | Liu et al. |

(56) References Cited

U.S. PATENT DOCUMENTS

| | | |
|---|---|---|
| 2006/0112272 A1 | 5/2006 | Morioka et al. |
| 2006/0129684 A1 | 6/2006 | Datta |
| 2006/0135198 A1 | 6/2006 | Lee |
| 2006/0156416 A1 | 7/2006 | Huotari et al. |
| 2006/0161577 A1 | 7/2006 | Kulkarni et al. |
| 2006/0168070 A1 | 7/2006 | Thompson et al. |
| 2006/0171365 A1 | 8/2006 | Borella |
| 2006/0179153 A1 | 8/2006 | Lee et al. |
| 2006/0182103 A1 | 8/2006 | Martini et al. |
| 2006/0184647 A1 | 8/2006 | Dixit et al. |
| 2006/0209853 A1 | 9/2006 | Hidaka et al. |
| 2006/0230148 A1 | 10/2006 | Forecast et al. |
| 2006/0233106 A1 | 10/2006 | Achlioptas et al. |
| 2006/0242300 A1 | 10/2006 | Yumoto et al. |
| 2006/0268704 A1 | 11/2006 | Ansari et al. |
| 2006/0291483 A1 | 12/2006 | Sela |
| 2006/0294054 A1 | 12/2006 | Kudo et al. |
| 2007/0006293 A1 | 1/2007 | Balakrishnan et al. |
| 2007/0016662 A1 | 1/2007 | Desai et al. |
| 2007/0019658 A1 | 1/2007 | Park et al. |
| 2007/0050843 A1 | 3/2007 | Manville et al. |
| 2007/0058670 A1 | 3/2007 | Konduru et al. |
| 2007/0064661 A1 | 3/2007 | Sood et al. |
| 2007/0083646 A1 | 4/2007 | Miller et al. |
| 2007/0088822 A1 | 4/2007 | Coile et al. |
| 2007/0106796 A1 | 5/2007 | Kudo et al. |
| 2007/0107048 A1 | 5/2007 | Halls et al. |
| 2007/0118879 A1 | 5/2007 | Yeun |
| 2007/0174491 A1 | 7/2007 | Still et al. |
| 2007/0220598 A1 | 9/2007 | Salowey et al. |
| 2007/0233809 A1 | 10/2007 | Brownell et al. |
| 2007/0255848 A1* | 11/2007 | Sewall .............. H04L 29/12066 709/232 |
| 2007/0258451 A1 | 11/2007 | Bouat |
| 2007/0297410 A1 | 12/2007 | Yoon et al. |
| 2007/0297551 A1 | 12/2007 | Choi |
| 2008/0008202 A1 | 1/2008 | Terrell et al. |
| 2008/0025297 A1 | 1/2008 | Kashyap |
| 2008/0028456 A1 | 1/2008 | O'Rourke et al. |
| 2008/0031258 A1 | 2/2008 | Acharya et al. |
| 2008/0034136 A1 | 2/2008 | Ulenas |
| 2008/0072303 A1 | 3/2008 | Syed |
| 2008/0120370 A1 | 5/2008 | Chan et al. |
| 2008/0130812 A1 | 6/2008 | Eom et al. |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0159145 A1 | 7/2008 | Muthukrishnan et al. |
| 2008/0165801 A1 | 7/2008 | Sheppard |
| 2008/0178278 A1 | 7/2008 | Grinstein et al. |
| 2008/0201331 A1* | 8/2008 | Eriksen ............ G06F 17/30902 |
| 2008/0201599 A1 | 8/2008 | Ferraiolo et al. |
| 2008/0205613 A1 | 8/2008 | Lopez |
| 2008/0209053 A1 | 8/2008 | Shen et al. |
| 2008/0222646 A1 | 9/2008 | Sigal et al. |
| 2008/0225710 A1 | 9/2008 | Raja et al. |
| 2008/0229415 A1 | 9/2008 | Kapoor et al. |
| 2008/0235508 A1 | 9/2008 | Ran et al. |
| 2008/0239986 A1 | 10/2008 | Xu et al. |
| 2008/0253395 A1 | 10/2008 | Pandya |
| 2008/0256224 A1 | 10/2008 | Kaji et al. |
| 2008/0279200 A1 | 11/2008 | Shatzkamer et al. |
| 2008/0282354 A1 | 11/2008 | Wobber et al. |
| 2008/0288661 A1 | 11/2008 | Galles |
| 2008/0301760 A1 | 12/2008 | Lim |
| 2008/0316922 A1 | 12/2008 | Riddle et al. |
| 2009/0028337 A1 | 1/2009 | Balabine et al. |
| 2009/0040926 A1 | 2/2009 | Li et al. |
| 2009/0049230 A1 | 2/2009 | Pandya |
| 2009/0070617 A1 | 3/2009 | Arimilli et al. |
| 2009/0077619 A1 | 3/2009 | Boyce |
| 2009/0094610 A1 | 4/2009 | Sukirya |
| 2009/0119504 A1 | 5/2009 | van Os et al. |
| 2009/0125496 A1 | 5/2009 | Wexler et al. |
| 2009/0125532 A1 | 5/2009 | Wexler et al. |
| 2009/0125622 A1 | 5/2009 | O'Sullivan et al. |
| 2009/0125625 A1 | 5/2009 | Shim et al. |
| 2009/0138749 A1 | 5/2009 | Moll et al. |
| 2009/0141891 A1 | 6/2009 | Boyen et al. |
| 2009/0157678 A1 | 6/2009 | Turk |
| 2009/0193126 A1 | 7/2009 | Agarwal et al. |
| 2009/0193513 A1 | 7/2009 | Agarwal et al. |
| 2009/0196282 A1 | 8/2009 | Fellman et al. |
| 2009/0228956 A1 | 9/2009 | He et al. |
| 2009/0248893 A1 | 10/2009 | Richardson et al. |
| 2009/0287935 A1 | 11/2009 | Aull et al. |
| 2009/0296624 A1 | 12/2009 | Ryu et al. |
| 2009/0300407 A1 | 12/2009 | Kamath et al. |
| 2010/0011420 A1 | 1/2010 | Drako |
| 2010/0011434 A1 | 1/2010 | Kay |
| 2010/0017846 A1 | 1/2010 | Huang et al. |
| 2010/0023582 A1 | 1/2010 | Pedersen et al. |
| 2010/0042693 A1 | 2/2010 | Eriksson |
| 2010/0071048 A1 | 3/2010 | Novak et al. |
| 2010/0088417 A1* | 4/2010 | Amemiya .............. H04L 69/18 709/227 |
| 2010/0115236 A1 | 5/2010 | Bataineh et al. |
| 2010/0122091 A1 | 5/2010 | Huang et al. |
| 2010/0150154 A1 | 6/2010 | Viger et al. |
| 2010/0154031 A1 | 6/2010 | Montemurro et al. |
| 2010/0165877 A1 | 7/2010 | Shukla et al. |
| 2010/0188976 A1 | 7/2010 | Rahman et al. |
| 2010/0189052 A1 | 7/2010 | Kavanagh et al. |
| 2010/0242092 A1 | 9/2010 | Harris et al. |
| 2010/0251330 A1 | 9/2010 | Kroeselberg et al. |
| 2010/0279733 A1 | 11/2010 | Karsten et al. |
| 2010/0299451 A1 | 11/2010 | Yigang et al. |
| 2010/0322250 A1 | 12/2010 | Shetty et al. |
| 2010/0325277 A1 | 12/2010 | Muthiah et al. |
| 2011/0029654 A1 | 2/2011 | Takeda et al. |
| 2011/0040889 A1 | 2/2011 | Garrett et al. |
| 2011/0047620 A1 | 2/2011 | Mahaffey et al. |
| 2011/0052016 A1 | 3/2011 | Nishii |
| 2011/0066718 A1 | 3/2011 | Susai et al. |
| 2011/0107077 A1 | 5/2011 | Henderson et al. |
| 2011/0141900 A1 | 6/2011 | Jayawardena et al. |
| 2011/0153822 A1 | 6/2011 | Rajan et al. |
| 2011/0154443 A1 | 6/2011 | Thakur et al. |
| 2011/0173295 A1 | 7/2011 | Bakke et al. |
| 2011/0184733 A1 | 7/2011 | Yu et al. |
| 2011/0197059 A1 | 8/2011 | Klein et al. |
| 2011/0202676 A1 | 8/2011 | Craig et al. |
| 2011/0246800 A1 | 10/2011 | Accpadi et al. |
| 2011/0271005 A1 | 11/2011 | Bharrat |
| 2011/0273984 A1 | 11/2011 | Hsu et al. |
| 2011/0277016 A1 | 11/2011 | Hockings et al. |
| 2011/0282997 A1 | 11/2011 | Prince et al. |
| 2011/0314178 A1 | 12/2011 | Kanode et al. |
| 2011/0321122 A1 | 12/2011 | Mwangi et al. |
| 2012/0016994 A1 | 1/2012 | Nakamura et al. |
| 2012/0030341 A1 | 2/2012 | Jensen et al. |
| 2012/0039341 A1 | 2/2012 | Latif et al. |
| 2012/0041965 A1 | 2/2012 | Vasquez et al. |
| 2012/0063314 A1 | 3/2012 | Pignataro et al. |
| 2012/0066489 A1 | 3/2012 | Ozaki et al. |
| 2012/0079055 A1 | 3/2012 | Robinson |
| 2012/0101952 A1 | 4/2012 | Raleigh et al. |
| 2012/0124372 A1 | 5/2012 | Dilley et al. |
| 2012/0143883 A1* | 6/2012 | Chen ................... G06F 17/3089 707/751 |
| 2012/0191847 A1 | 7/2012 | Nas et al. |
| 2012/0198043 A1 | 8/2012 | Hesketh et al. |
| 2012/0198512 A1 | 8/2012 | Zhou et al. |
| 2012/0210416 A1 | 8/2012 | Mihelich et al. |
| 2012/0210417 A1 | 8/2012 | Shieh |
| 2012/0224531 A1 | 9/2012 | Karuturi et al. |
| 2012/0311153 A1 | 12/2012 | Morgan |
| 2012/0317266 A1 | 12/2012 | Abbott |
| 2013/0003106 A1 | 1/2013 | Lowery et al. |
| 2013/0029726 A1 | 1/2013 | Berionne et al. |
| 2013/0044757 A1 | 2/2013 | Rai et al. |
| 2013/0091002 A1 | 4/2013 | Christie et al. |
| 2013/0163758 A1 | 6/2013 | Swaminathan et al. |
| 2013/0198322 A1 | 8/2013 | Oran et al. |

(56) References Cited

U.S. PATENT DOCUMENTS

| | | | |
|---|---|---|---|
| 2013/0205361 A1 | 8/2013 | Narayanaswamy et al. | |
| 2013/0212127 A1 | 8/2013 | Kitamura | |
| 2013/0336122 A1 | 12/2013 | Baruah et al. | |
| 2013/0339429 A1* | 12/2013 | Richardson | H04L 61/1511 709/203 |
| 2014/0040478 A1 | 2/2014 | Hsu et al. | |
| 2014/0059678 A1 | 2/2014 | Parker | |
| 2014/0095661 A1 | 4/2014 | Knowles et al. | |
| 2014/0162705 A1 | 6/2014 | de Wit et al. | |
| 2014/0171089 A1 | 6/2014 | Janakiraman et al. | |
| 2014/0269484 A1 | 9/2014 | Dankberg et al. | |
| 2014/0317404 A1 | 10/2014 | Carlson et al. | |
| 2015/0127830 A1* | 5/2015 | Brown | H04L 47/323 709/225 |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"Windows Server 2003 Kerberos Extensions," Microsoft TechNet, 2003, 8 pages, (Updated Jul. 31, 2004), http://technet.microsoft.com/en-us/library/cc738207, Microsoft Corporation.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

Crescendo Networks, "Application Layer Processing (ALP)," 2003-2009, pp. 168-186, Chapter 9, CN-5000E/5500E, Foxit Software Company.

European Search Report for corresponding EP Application No. 14753736.9, Sep. 23, 2016, pp. 1-8.

F5 Networks Inc., "Configuration Guide for Local Traffic Management," F5 Networks Inc., Jan. 2006, version 9.2.2, 406 pgs.

F5 Networks. BIG-IP GTM and BIG-IP Link Controller, Release Notes, Jul. 20, 2015, v.11.6.0.

F5 Networks. BIG-IP Virtual, Release Notes, Dec. 8, 2014, Edition 11.6.0.

F5 Networks. BIG-IP® Global Traffic Manager™: Implementations, Manual, Apr. 17, 2015, pp. 1-118, v11.6.

F5 Networks. BIG-IP® TMOS®: Routing Administration, Manual, Apr. 10, 2015, pp. 1-140, v11.6.

F5 Networks. Local Traffic Manager and Global Traffic Manager Operations Guide, Manual, Jan. 21, 2015, pp. 1-144, v1.0.

Fielding et al., "Hypertext Transfer Protocol—HTTP/1.1," Network Working Group, RFC: 2068, Jan. 1997, pp. 1-162.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

International Search Report for International Patent Application No. PCT/US2013/026615 (Jul. 4, 2013).

International Search Report for International Patent Application No. PCT/US2014/018431 (Jul. 9, 2014).

Macvittie L., "Message-Based Load Balancing," Technical Brief, Jan. 2010, pp. 1-9, F5 Networks, Inc.

OWASP, "Testing for Cross site scripting", OWASP Testing Guide v2, Table of Contents, Feb. 24, 2011, pp. 1-5, (www.owasp.org/index.php/Testing_for_Cross_site_scripting).

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

\* cited by examiner

METHODS FOR NETWORK TRAFFIC PRESTEERING AND DEVICES THEREOF

This application claims the benefit of U.S. Provisional Patent Application Ser. No. 62/037,935, filed on Aug. 15, 2014, which is hereby incorporated by reference in its entirety.

FIELD

This technology relates to network traffic management and, more particularly, to methods and devices for presteering network traffic to facilitate optimization of content corresponding to the network traffic.

BACKGROUND

In many communication service provider networks, it is advantageous to steer a subset of the overall subscriber traffic to value-added service (VAS) server devices that can process the traffic based upon a classification of the traffic. By way of example only, traffic associated with video type content can be steered through a VAS server device with a video optimizer application that can process or optimize the content prior to forwarding the content to requesting client devices.

Currently, in order to retrieve content, a client device can request that a Domain Name System (DNS) server device resolve a domain name and receive an Internet Protocol (IP) address in response. With the IP address, the client device can establish a connection with a server device and request the content. Upon the content being sent to the client device from the server device, the content and associated domain name can be classified (e.g., as video type content). Thereafter, requests for content associated with the domain name can be steered based on the classification.

However, this process is repeated for subsequent requests for content associated with the domain name from other client devices. Since the classification can only occur subsequent to retrieved content being classified, initial requests by the other client devices for the content associated with the domain name will not be steered, which is undesirable.

SUMMARY

A method for network traffic presteering includes forwarding, by a traffic manager computing device, a request to resolve a domain name from a client device to a Domain Name System (DNS) server device and a response from the DNS server device including an original Internet Protocol (IP) address corresponding to the domain name to the client device. Content is retrieved, by the traffic manager computing device, from a location associated with the domain name in response to a request for the content received from the client device. Classification information comprising at least a type of the retrieved content is determined by the traffic manager computing device. The retrieved content is sent, by the traffic manager computing device, to the client device in response to the request for the content. A determination is made, by the traffic manager computing device, when a confidence threshold has been exceeded based on the classification information. At least a steering endpoint IP address, identified based on the type of the retrieved content, is sent, by the traffic manager computing device, to the DNS server device, when the determining indicates that the confidence threshold has been exceeded.

A traffic manager computing device includes a processor and a memory coupled to the processor which is configured to be capable of executing programmed instructions comprising and stored in the memory to forward a request to resolve a domain name from a client device to a DNS server device and a response from the DNS server device including an original IP address corresponding to the domain name to the client device. Content is retrieved from a location associated with the domain name in response to a request for the content received from the client device. Classification information comprising at least a type of the retrieved content is determined. The retrieved content is sent to the client device in response to the request for the content. A determination is made when a confidence threshold has been exceeded based on the classification information. At least a steering endpoint IP address, identified based on the type of the retrieved content, is sent to the DNS server device, when the determining indicates that the confidence threshold has been exceeded.

A non-transitory computer readable medium having stored thereon instructions for network traffic presteering comprising executable code which when executed by a processor, causes the processor to perform steps including forwarding a request to resolve a domain name from a client device to a DNS server device and a response from the DNS server device including an original IP address corresponding to the domain name to the client device. Content is retrieved from a location associated with the domain name in response to a request for the content received from the client device. Classification information comprising at least a type of the retrieved content is determined. The retrieved content is sent to the client device in response to the request for the content. A determination is made when a confidence threshold has been exceeded based on the classification information. At least a steering endpoint IP address, identified based on the type of the retrieved content, is sent to the DNS server device, when the determining indicates that the confidence threshold has been exceeded.

A method for network traffic presteering includes receiving, by a Domain Name System (DNS) server device, a request originating from a client device to resolve an original Internet Protocol (IP) address of a domain name included in the request. A determination is made, by the DNS server device, when a steering endpoint IP address corresponding to the original IP address is stored. The corresponding steering endpoint IP address is sent, by the DNS server device, to the client device in response to the request, when the determining indicates that the steering endpoint IP address corresponding to the original IP address is stored. The original IP address is resolved, by the DNS server device, and sent to the client device in response to the request, when the determining indicates that the steering endpoint IP address corresponding to the original IP address is not stored.

A Domain Name System (DNS) server device includes a processor and a memory coupled to the processor which is configured to be capable of executing programmed instructions comprising and stored in the memory to receive a request originating from a client device to resolve an original IP address of a domain name included in the request. A determination is made when a steering endpoint IP address corresponding to the original IP address is stored. The corresponding steering endpoint IP address is sent to the client device in response to the request, when the determining indicates that the steering endpoint IP address corresponding to the original IP address is stored. The original IP address is resolved and sent to the client device in response to the request, when the determining indicates that the steering endpoint IP address corresponding to the original IP address is not stored.

A non-transitory computer readable medium having stored thereon instructions for network traffic presteering comprising executable code which when executed by a processor, causes the processor to perform steps including receiving a request originating from a client device to resolve an original IP address of a domain name included in the request. A determination is made when a steering endpoint IP address corresponding to the original IP address is stored. The corresponding steering endpoint IP address is sent to the client device in response to the request, when the determining indicates that the steering endpoint IP address corresponding to the original IP address is stored. The original IP address is resolved and sent to the client device in response to the request, when the determining indicates that the steering endpoint IP address corresponding to the original IP address is not stored.

This technology has a number of associated advantages including providing methods, non-transitory computer readable media, traffic manager computing devices, and DNS server devices that facilitate more efficient and effective presteering of network traffic to optimization devices prior to delivery to requested client devices. With this technology, DNS is used to route network traffic associated with previously classified domain names to value-added service (VAS) server devices that optimize the content associated with the network traffic. Accordingly, client devices can advantageously receive presteered, optimized content relatively quickly.

DETAILED DESCRIPTION

Figure 1:
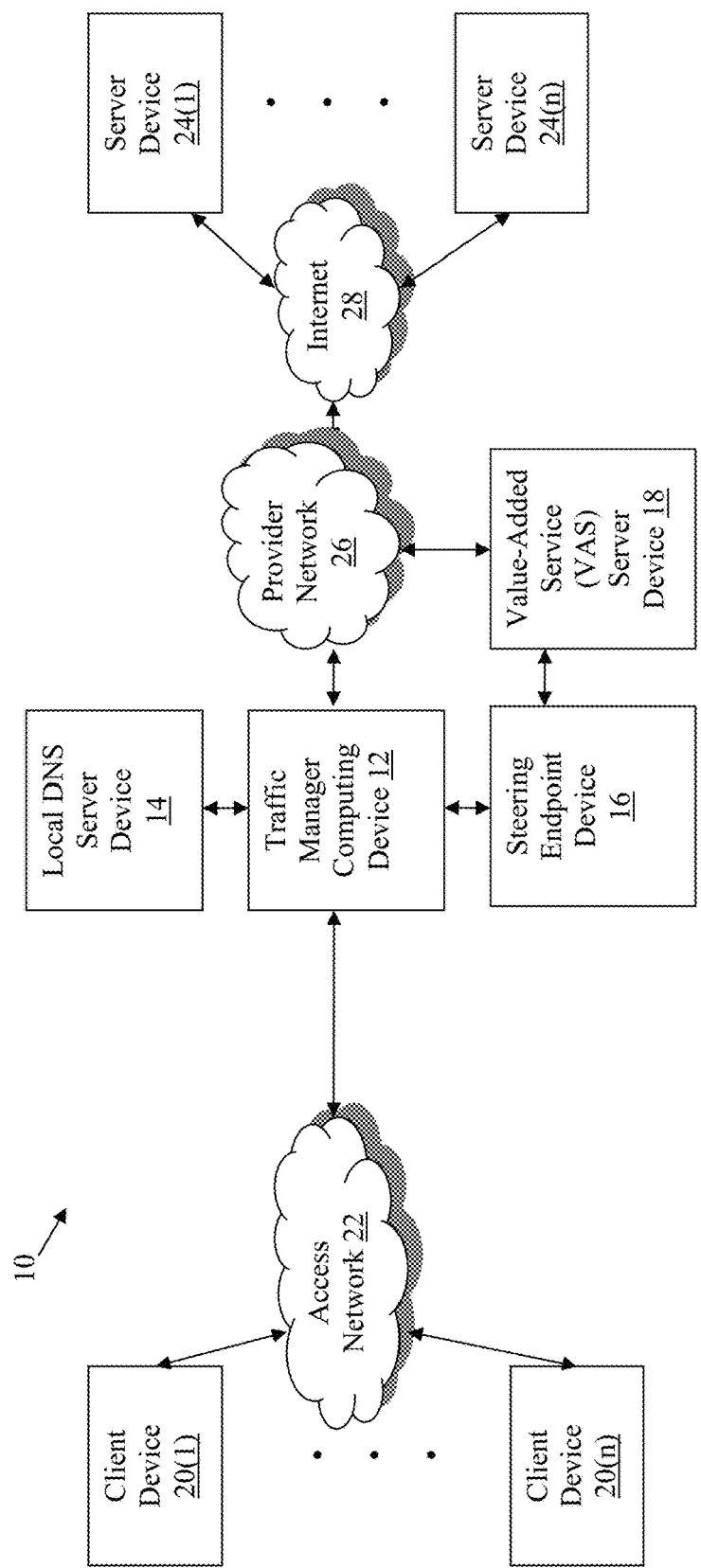
FIG. 1 a block diagram of a network environment with an exemplary traffic manager computing device, an exemplary local Domain Name System (DNS) server device, an exemplary steering endpoint device, and an exemplary value-added service (VAS) server device.

Referring to FIG. 1, a block diagram is shown including an exemplary network environment 10 which incorporates a traffic manager computing device 12, such as a policy enforcement manager (PEM) device by way of example only, coupled to a local Domain Name System (DNS) server device 14, a steering endpoint device 16 coupled to a value-added service (VAS) server device 18, a plurality of client devices 20(1)-20(2) by an access network 22, and a plurality of server devices 24(1)-24(n) by a provider network 26 and the Internet 28, although one or more of these devices can be coupled together via other topologies. Additionally, the network environment 10 may include other network devices such as one or more routers and/or switches, by way of example only, which are known to those skilled in the art and will not be described here. This technology provides a number of advantages including methods, non-transitory computer readable media, and traffic manager computing and local DNS server devices that presteer requests for content associated with previously classified domains through VAS server devices allowing for optimized content to be returned in response.

Figure 2:
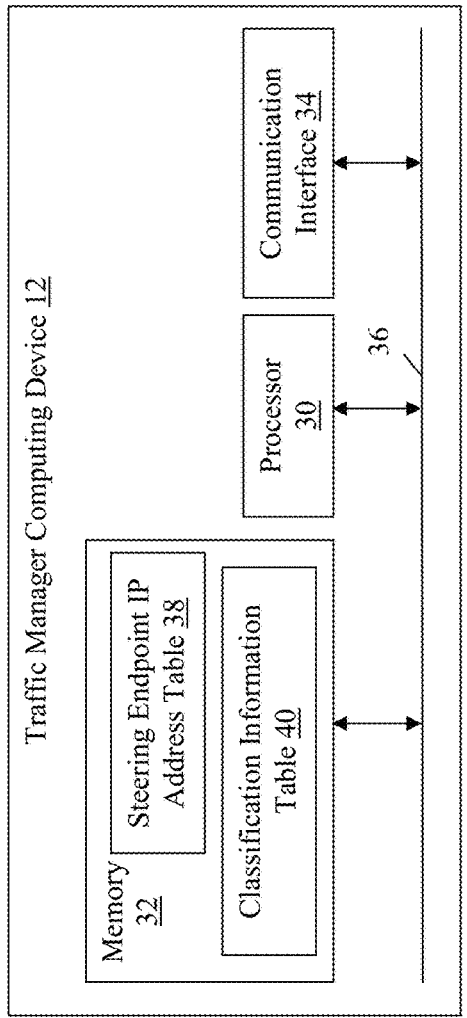
FIG. 2 is a block diagram of the exemplary traffic manager computing device shown in FIG. 1.

Referring to FIGS. 1-2, the traffic manager computing device 12 may perform any number of functions including providing services based on subscriber application usage, classifying network traffic, regulating network usage, implementing tailored service plans, managing bandwidth consumption and network capacity, and reducing network congestion, by way of example only. The traffic manager computing device 12 includes a processor 30, a memory 32, and a communication interface 34 which are coupled together by a bus or other communication link, although the traffic manager computing device 12 may include other types and/or numbers of elements in other configurations.

The processor 30 of the traffic manager computing device 12 may execute programmed instructions stored in the memory 32 of the traffic manager computing device 12 for the any number of the functions identified above and described and illustrated herein. The processor 30 of the traffic manager computing device 12 may include one or more CPUs or general purpose processors with one or more processing cores, by way of example only.

The memory 32 of the traffic manager computing device 12 stores these programmed instructions for one or more aspects of the present technology, as described and illustrated herein, although some or all of the programmed instructions could be stored and executed elsewhere. A variety of different types of memory storage devices, such as random access memory (RAM), read only memory (ROM), hard disk, or other computer readable media which is read from and written to by a magnetic, optical, or other reading and writing system that is coupled to the processor 30, can be used for the memory 32.

In this example, the memory 32 includes a steering endpoint Internet Protocol (IP) address table 38 and a classification information table 40. The steering endpoint IP address table 38 stores IP addresses for steering endpoints, which can correspond with virtual servers hosted by the steering endpoint device 16, by way of example only. Accordingly, the traffic manager computing device 12 uses the steering endpoint IP address table 38 to identify available and appropriate steering endpoint IP address to send to the local DNS server device 14, as described and illustrated in more detail later.

The classification information table 40 includes per-domain name information regarding the type of content retrieved and the number of times content of a certain type has been observed by the traffic manager computing device 12, by way of example only. Additionally, the classification information table 40 in this particular example includes an indication of whether a domain name has been classified for a specific one of the client devices 20(1)-20(n). The traffic manager computing device 12 uses the classification information table 40 to determine when a confidence threshold has been exceeded such that all subsequent first requests for content associated with a domain name from one or more of the client devices 20(1)-20(n) should be presteered, as described and illustrated in more detail later.

The communication interface 34 in the traffic manager computing device 12 operatively couples and communicates between the traffic manager computing device 12 and at least the client devices 20(1)-2(n), server devices 24(1)-24(n), local DNS server device 14, and VAS server device 18, which are all coupled together by the access network 22, provider network 26, and the Internet 28, although other types and/or numbers of communication networks or systems with other types and/or numbers of connections and configurations to other devices and elements can also be used.

By way of example only, the access network 22, provider network 26, and/or Internet 28 can use TCP/IP over Ethernet and industry-standard protocols, although other types and/or numbers of communication networks, can be used. The access network 22, provider network 26, and/or Internet 28 in this example may employ any suitable interface mechanisms and network communication technologies including, by way of example only, teletraffic in any suitable form (e.g., voice, modem, and the like), Public Switched Telephone Network (PSTNs), Ethernet-based Packet Data Networks (PDNs), combinations thereof, and the like.

Figure 3:
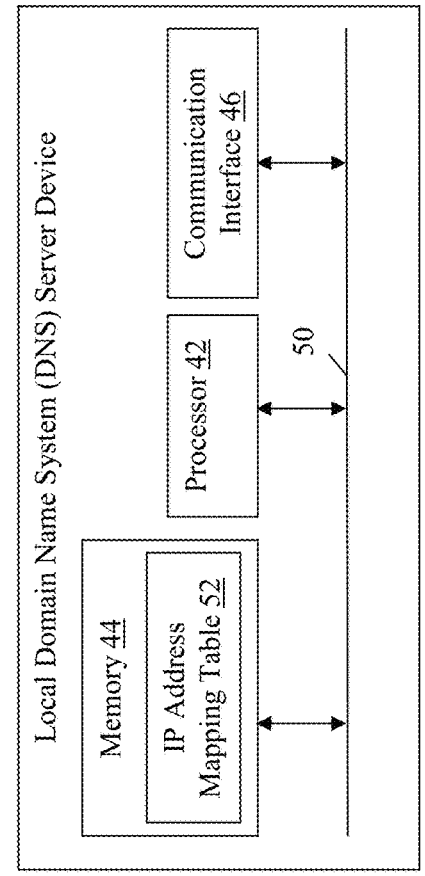
FIG. 3 is a block diagram of the local DNS server device.

Referring to FIGS. 1-3, the local DNS server device 14 may perform any number of functions including receiving domain names from the client devices 20(1)-20(n) and returning IP addresses to the client devices 20(1)-20(n), by way of example only. In other examples, the traffic manager computing device 12 and local DNS server device 14 can be located on the same physical device in the network environment 10. The local DNS server device 14 in this example includes a processor 42, a memory 44, and a communication interface 46, which are coupled together by a bus or other communication link, although the local DNS server device 14 may include other types and/or numbers of elements in other configurations.

The processor 42 of the local DNS server device 14 may execute programmed instructions stored in the memory 44 of the local DNS server device 14 for the any number of the functions identified above and described and illustrated herein. The processor 42 of the local DNS server device 14 may include one or more CPUs or general purpose processors with one or more processing cores, by way of example only.

The memory 44 of the local DNS server device 14 stores these programmed instructions for one or more aspects of the present technology, as described and illustrated herein, although some or all of the programmed instructions could be stored and executed elsewhere. A variety of different types of memory storage devices, such as random access memory (RAM), read only memory (ROM), hard disk, or other computer readable media which is read from and written to by a magnetic, optical, or other reading and writing system that is coupled to the processor 42, can be used for the memory 44.

In this particular example, the memory 44 includes an IP address mapping table 52. The IP address mapping table 52 stores original IP addresses and/or domain names corresponding with steering endpoint IP address, as received from the traffic manager computing device 12, as described and illustrated in more detail later. Accordingly, the local DNS server device 14 uses the IP address mapping table 52 to determine when a steering endpoint IP address has been previously stored for the domain name so that the local DNS server device 14 can resolve the domain name to the steering endpoint IP address and thereby steer requests from one of the client devices 20(1)-20(n) associated with the domain name through the steering endpoint device 16 and VAS server device 18.

The communication interface 46 in the local DNS server device 14 operatively couples and communicates between the local DNS server device 14 and at least the traffic manager computing device 12, which are all coupled together by the access network 22 in this example, although other types and/or numbers of communication networks or systems with other types and/or numbers of connections and configurations to other devices and elements can also be used.

The steering endpoint device 16 in this example includes a processor, a memory, and a communication interface, which are coupled together by a bus or other communication link, although other types and/or numbers of network devices could be used. The steering endpoint device 16 can host a plurality of virtual services each having an associated steering endpoint IP address and configured to forward certain requests received from the client devices 20(1)-20(n) through the VAS server device 18 to one or more of the server devices 24(1)-24(n) hosting the requested content.

The VAS server device 18 in this example includes a processor, a memory, and a communication interface, which are coupled together by a bus or other communication link, although other types and/or numbers of network devices could be used. The VAS server device 18 hosts application (s) configured to process or optimize content requested by the client devices 20(1)-20(n) such as a video optimizer application, by way of example only, although any other type of application can be used. Accordingly, the VAS server device 18 can receive client device requests from virtual servers hosted by the steering endpoint device 16 and forward the requests to appropriate ones of the server devices 24(1)-24(n). The responses from the server devices 24(1)-24(n) are routed back to through the VAS server device 18, the requested content is processed or optimized, and the processed or optimized content is then returned to the requesting ones of the client devices 20(1)-20(n), as described and illustrated in more detail later.

Each of the server devices 24(1)-24(n) includes a processor, a memory, and a communication interface, which are coupled together by a bus or other communication link, although other types and/or numbers of network devices could be used. Generally, the server devices 24(1)-24(n) process requests received from requesting client devices 20(1)-20(n) via the access network 22, the provider network 26, and the Internet 28 according to the HTTP-based application RFC protocol, by way of example only, and respond to the client devices 20(1)-20(n) with the requested content. The server devices 24(1)-24(n) may be hardware or software or may represent a system with multiple servers in a server device pool, which may include internal or external networks.

Each of the client devices 20(1)-20(n) in this example include a processor, a memory, and a communication interface, which are coupled together by a bus or other communication link, although other types and/or numbers of network devices could be used. The client devices 20(1)-20(n) may run interface applications, such as Web browsers by way of example only, that may provide an interface to make requests for and receive content stored on one or more of the server devices 24(1)-24(n) via the access network 22, the provider network 26, and the Internet 28. Each of the client devices 20(1)-20(n) may further include a display device, such as a display screen or touchscreen, and/or an input device, such as a keyboard by way of example only.

Although the exemplary network environment 10 with the traffic manager computing device 12, local DNS server device 14, steering endpoint device 16, VAS server device 18, client devices 20(1)-20(n), server devices 24(1)-24(n), access network 22, provider network 26, and the Internet 28 are described and illustrated herein, other types and/or numbers of systems, devices, components, and elements in other topologies can be used. The systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as non-transitory computer readable media having instructions stored thereon for one or more aspects of the present technology as described and illustrated by way of the examples herein, which when executed by a processor, cause the processor to carry out the steps necessary to implement the methods of the examples, as described and illustrated herein.

Figure 4:
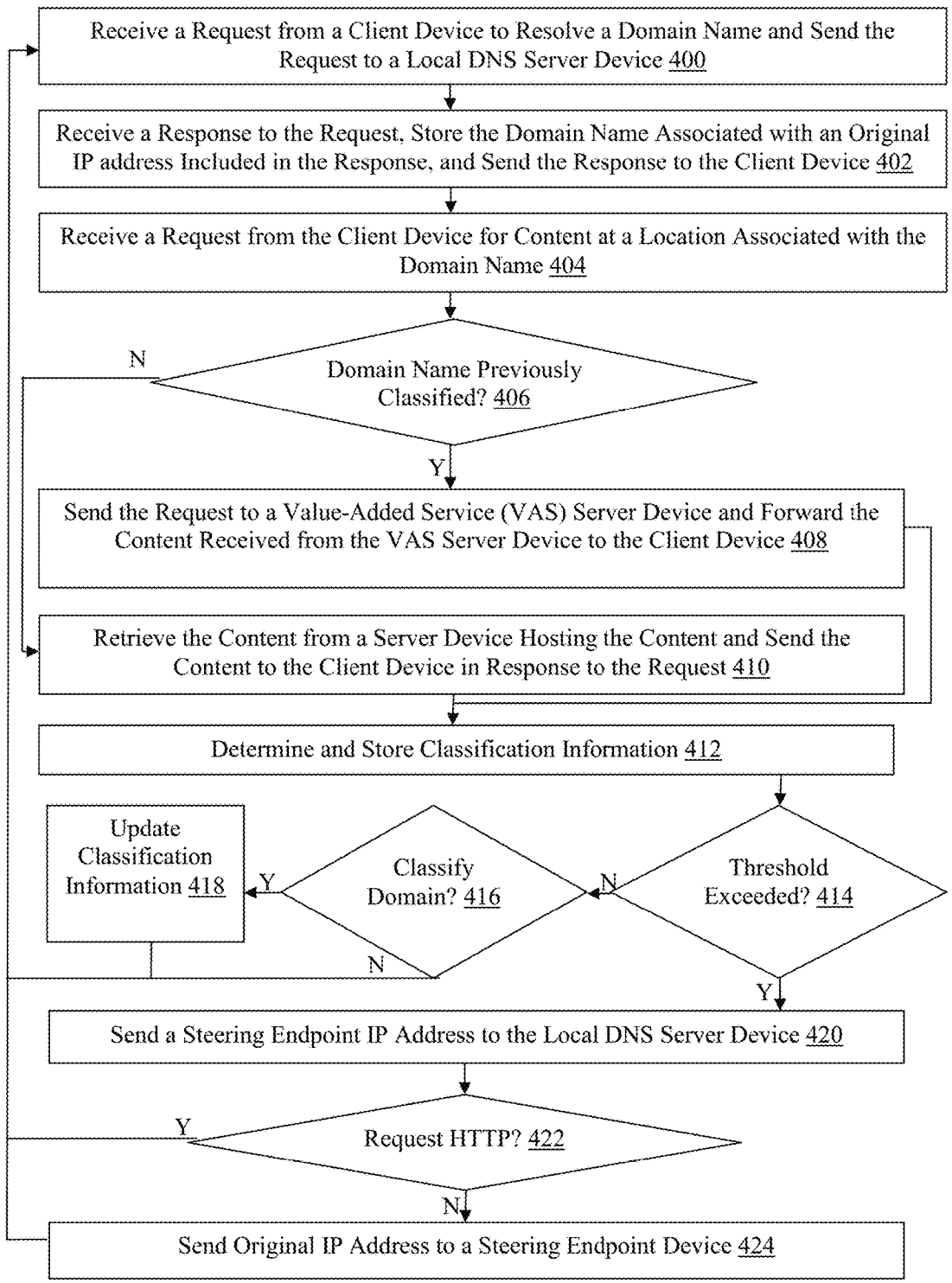
FIG. 4 is a flowchart of an exemplary method for facilitating network traffic presteering with the exemplary traffic manager computing device.

An exemplary method for network traffic presteering will now be described with reference to FIGS. 1-8. Referring more specifically to FIG. 4, an exemplary method for facilitating network traffic presteering with the traffic manager computing device 12 will now be described. In step 400 in this example, the traffic manager computing device 12 receives a request from one of the client devices 20(1)-20(n) to resolve a domain name and sends the request to the local DNS server device 14. The request can originate from a web browser executed on the one of the client devices 20(1)-20(n), by way of example only, in response to a user of the one of the client devices 20(1)-20(n) requesting content (e.g., a video file associated with the "www.onlinefishing.tv" domain name, as used in the example described and illustrated later with reference to FIG. 8).

In step 402, the traffic manager computing device 12 receives a response to the request from the local DNS server device 14, stores the domain name associated with an original IP address included in the response, and sends the response to the requesting one of the client devices 20(1)-20(n). The traffic manager computing device 12 can store the domain name as associated with the corresponding original IP address in an entry of the classification information table 40, by way of example only, although the domain name and original IP address can also be stored elsewhere.

In step 404, the traffic manager computing device 12 receives a request from the one of the client devices 20(1)-20(n) for content at a location associated with the domain name. In the example described and illustrated later with reference to FIG. 8, the content is at a "/video/free" location associated with the "www.onlinefishing.tv" domain name.

In step 406, the traffic manager computing device 12 determines whether the domain name was previously classified. Domain names can be classified for a specific one of the client devices 20(1)-20(n) even if a confidence threshold has not been exceeded for the domain name, as described and illustrated in more detail later. Domain names can be classified for one of the client devices 20(1)-20(n) based on an established policy and can be stored in the entry of the classification information table 40 for the domain name.

By way of example only, the traffic manager computing device 12 can classify a domain name for one of the client devices 20(1)-20(n) when a specified number of received requests associated with the domain name are for content of a specific type, such as video by way of example only. Accordingly, a first request for content associated with a domain name will not be previously classified since the requested content and associated characteristics have not been observed yet by the traffic manager computing device 12. However, if the request is a second or subsequent request for content associated with a domain name, and the traffic manager computing device 12 determines in step 406 that the domain name has been previously classified, then the Yes branch is taken to step 408.

In step 408, the traffic manager computing device 12 sends the request to the VAS server device 18 and forwards the content received from the VAS server device 18 back to the requesting one of the client devices 20(1)-20(n). The location or IP address of the VAS server device 18 can be stored in the memory 32 of the traffic manager computing device 12 as part of an initial configuration, by way of example only. In examples in which multiple VAS server devices are present in the network environment, the classification information table 40 can include an indication of the appropriate one of the VAS server devices for the classification associated with the domain name.

As described and illustrated in more detail later, the VAS server device 18 retrieves the requested content from one of the server devices 24(1)-24(n), processes or otherwise optimizes the content, and sends the processed or otherwise optimized content to the traffic manager computing device 12 for forwarding to the requesting one of the client devices 20(1)-20(n). Accordingly, the content returned to the one of the client devices 20(1)-20(n) in step 408 in this example is the processed or otherwise optimized content.

Referring back to step 406, if the traffic manager computing device 12 determines that the domain name has not been previously classified, then the No branch is taken to step 410. In step 410, the traffic manager computing device 12 retrieves the content from the one of the server devices 24(1)-24(n) hosting the content and sends the content to the requesting one of the client devices 20(1)-20(n).

Irrespective of whether the Yes or No branch is taken from step 406, and step 408 or 410 is performed, respectively, the traffic manager computing device 12 proceeds to step 412. In step 412, the traffic manager computing device 12 determines and stores classification information for the domain name in the classification table 40. Exemplary classification information can include the type of the content that was requested and/or a number of times content of the type has been requested from a location associated with the domain name, by way of example only, although other types and/or numbers of information can also be determined and stored in step 412.

By way of example only, the traffic manager computing device 12 may determine, such as from an HTTP header in the response by way of example only, that the requested content was of a video type. Accordingly, in step 412, the traffic manager computing device 12 may retrieve the entry for the domain name from the classification information table 40, determine that video type content has been previously requested and retrieved a specified number of times, and increment the number to reflect the most recent request for content of the video type from a location associated with the domain name.

In step 414, the traffic manager computing device 12 determines whether a confidence threshold has been exceeded based on the classification information stored in the classification information table 40 for the domain name. The traffic manager computing device 12 can determine whether a confidence threshold has been exceeded based on a stored policy. The determination is indicative of the likelihood that a subsequent request associated with the domain name will be for content of a certain type. By way of example only, the traffic manager computing device 12 can determine a confidence threshold has been exceeded when a specified number of the client devices 20(1)-20(n) have requested content of a certain type from location(s) associated with the domain name. In other examples, other types and/or numbers of classification information or other data can be used to determine whether a confidence threshold has been exceeded.

If the traffic manager computing device 12 determines that a confidence threshold has not been exceeded for the domain name, then the No branch is taken to step 416. In step 416, the traffic manager computing device 12 determines whether the domain name should be classified for the one of the client devices 20(1)-20(n) even though the confidence threshold has not been exceeded. In one example, the domain name can be classified based on a stored policy requiring a specified number of requests associated with the domain name for content of a certain type from the one of the client devices 20(1)-20(n), although the policy can utilize any other type or number of classification information.

If the traffic manager computing device 12 determines in step 416 that the domain name should be classified, then the Yes branch is taken to step 418. In step 418, the traffic manager computing device 12 updates the entry for the domain name in the classification information table 40 to indicate that the domain name is classified for the one of the client devices 20(1)-20(n) along with the classification such as video type content by way of example only.

Subsequent to updating the classification information, or if the traffic manager computing device 12 determines in step 416 that the domain name should not be classified and the No branch is taken, the traffic manager computing device 12 proceeds back to step 400 and another request from one of the client devices 20(1)-20(n) to resolve a domain name is received. In another example, the traffic manager computing device 12 can proceed back to step 404 and another request from the one of the client devices 20(1)-20(n) can be received for content at a location associated with the domain name. Since the one of the client devices 20(1)-20(n) already received the original IP address for the domain name in step 402, subsequent requests from the one of the client devices 20(1)-20(n) for content at locations associated with the domain name will not require that the domain name first be resolved by the local DNS server device and will therefore be received in step 404.

Referring back to step 414, if the traffic manager computing device 12 determines that the confidence threshold has been exceeded, then the Yes branch is taken to step 420. In step 420, the traffic manager computing device 12 sends a steering endpoint IP address to the local DNS server device 14. The steering endpoint IP address sent to the local DNS server device 14 can be retrieved by the traffic manager computing device 12 from the steering endpoint IP address table 38 stored in the memory 32. The steering endpoint IP address table 32 can store steering endpoint IP addresses corresponding with content classifications.

Accordingly, the traffic manager computing device 12 can query the steering endpoint IP address table 32 based on the classification of the content (e.g., video type content) to identify a corresponding steering endpoint IP address. The steering endpoint IP address can point to a virtual server hosted by the steering endpoint device 16, by way of example only. Subsequent requests from the client devices 20(1)-20(n) to resolve the domain name will result in the local DNS server device 14 returning the steering endpoint IP address instead of the original IP address, as described and illustrated in more detail later.

In step 422, the traffic manager computing device 12 determines whether the request received in step 404, and associated network traffic, is based on the HTTP protocol. If the traffic manager computing device 12 determines that the request conforms to the HTTP protocol, then the Yes branch is taken back to step 400 and another request from one of the client devices 20(1)-20(n) to resolve a domain name is received. Since the host header is a required header in the HTTP protocol, when a subsequent request for content at a location associated with the domain name is received from another one of the client devices 20(1)-20(n) by the steering endpoint device 16, the steering endpoint device 16 will be able to inspect the HTTP host header and resolve the IP destination to steer the request through the VAS server device 18 to the one of the server devices 24(1)-24(n) hosting the content, as described and illustrated in more detail later.

However, if the traffic manager computing device 12 determines in step 422 that the request is not an HTTP request, then the No branch is taken to step 424. In step 424, the traffic manager computing device 12 sends the original IP address to the steering endpoint device 16 associated with the steering endpoint IP address sent to the local DNS server device 14 in step 420. Accordingly, a subsequent non-HTTP request for content at a location associated with the domain name from another one of the client devices 20(1)-20(n) that is received by the steering endpoint device 16 will be able to be processed by the steering endpoint device 16 since the original IP address will be stored locally, as described and illustrated in more detail later. The original IP address can be retrieved from an entry of the classification information table 40 as stored as described and illustrated earlier with reference to step 402, although the original IP address can be obtained in other manners.

Subsequent to sending the original IP address to the steering endpoint device 16, the traffic manager computing device 12 proceeds back to step 400 and another request from one of the client devices 20(1)-20(n) to resolve a domain name is received. In another example, the traffic manager computing device 12 can proceed back to step 404 and receive another request from the one of the client devices 20(1)-20(n) for content at a location associated with the domain name. Although the domain name has been classified, the one of the client devices 20(1)-20(n) already has the original IP address and subsequent traffic will be steered through the VAS server device 18 by the traffic manager computing device 12, as described and illustrated earlier with reference to steps 406 and 408. However, requests for content at a location associated with the domain name by other of the client devices 20(1)-20(n) will be steered through the VAS server device 18 by the steering endpoint device 16, as described and illustrated in more detail later with reference to FIG. 6.

Figure 5:
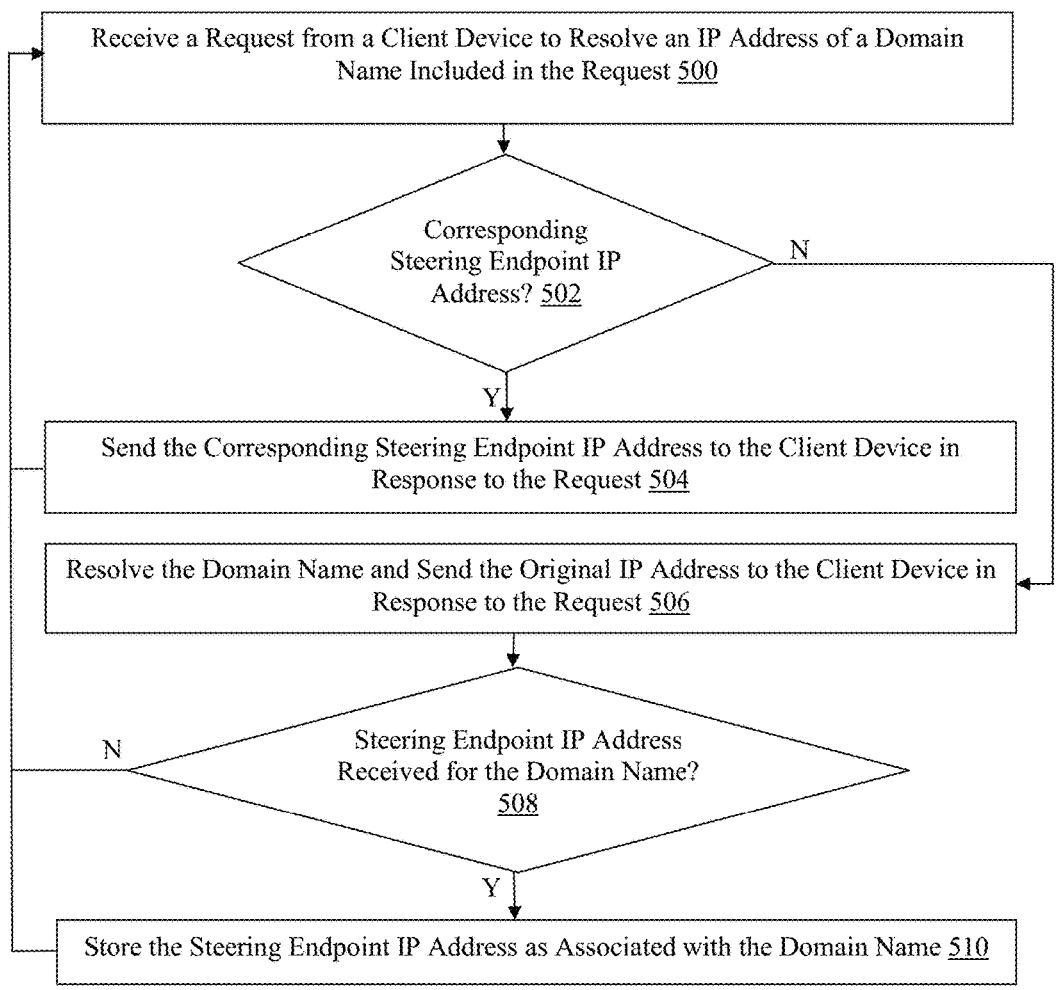
FIG. 5 is a flowchart of an exemplary method for steering client device requests with the exemplary local DNS server device.

Referring more specifically to FIG. 5, an exemplary method for steering client device requests with the local DNS server device 14 will now be described. In step 500 in this example, the local DNS server device 14 receives a request from one of the client devices 20(1)-20(n) to resolve an IP address of a domain name included in the request. The request can be forwarded by the traffic manager computing device 14, as described and illustrated earlier with reference to step 400 of FIG. 4, by way of example only.

In step 502, the local DNS server device 12 determines whether a steering endpoint IP address corresponding to the original IP address of the domain name, or the domain name itself, has been previously received and stored locally, such as in the IP address mapping table 52 by way of example only, as described and illustrated in more detail later. The steering endpoint IP address could have been received by the local DNS server device 14 as sent by the traffic manager computing device 12, as described and illustrated in more detail earlier with reference to step 420 of FIG. 4, by way of example only. Accordingly, if the local DNS server device 14 determines that there is a corresponding steering endpoint IP address, then the Yes branch is taken to step 504.

In step 504, the local DNS server device 12 sends the corresponding steering endpoint IP address to the one of the client devices 20(1)-20(n) in response to the request. If there is a corresponding steering endpoint IP address, then the traffic manager computing device 12 previously determined that a confidence threshold was exceeded for the domain name and that associated request traffic should be sent to the steering endpoint device 16 to be steered through the VAS server device 18. Accordingly, the steering endpoint IP address is sent to the one of the client devices 20(1)-20(n) instead of the original IP address for the domain name. Subsequent to sending the corresponding steering endpoint IP address to the one of the client devices 20(1)-20(n), the local DNS server device 14 proceeds back to step 500 and another request to resolve a domain name is received from one of the client devices 20(1)-20(n).

However, if the local DNS server device 14 determines in step 502 that there is not a corresponding steering endpoint IP address for the domain name, then the No branch is taken to step 506. In step 506, the local DNS server device 14 resolves the domain name and sends the original IP address for the one of the client devices 20(1)-20(n) in response to the request. Optionally, the local DNS server device 14 can send the response including the original IP address to the traffic manager computing device 12 to be forwarded to the one of the client devices 20(1)-20(n), as described and illustrated in more detail earlier with reference to step 402 of FIG. 4.

Subsequent to resolving the domain name and sending the response including the original IP address, the local DNS server device 14 proceeds to step 508. In step 508, the local DNS server device 14 determines whether a steering endpoint IP address is received for the domain name from the traffic manager computing device 12. The steering endpoint IP address can be sent by the traffic manager computing device 12 as described and illustrated earlier with reference to step 420 of FIG. 4, by way of example only. If the local DNS server device 14 determines a steering endpoint IP address is not received for the domain name, then the No branch is taken back to step 500 and another request to resolve a domain name is received from one of the client devices 20(1)-20(n).

However, if the local DNS server device 14 determines in step 508 that a steering endpoint IP address has been received for the domain name, then the Yes branch is taken to step 510. In step 510, the steering endpoint IP address is stored as associated with the domain name and/or the original IP address corresponding to the domain name. The steering endpoint IP address can be stored in the IP address mapping table 52, by way of example only, although the steering endpoint IP address and corresponding domain name and/or original IP address can also be stored elsewhere. Accordingly, subsequent requests to resolve the domain name from another of the client devices 20(1)-20(n) will result in the local DNS server device 14 comparing the domain name, by way of example only, to the IP address mapping table 52 and retrieving and returning the steering endpoint IP address associated with the domain name in the IP address mapping table 52.

Figure 6:
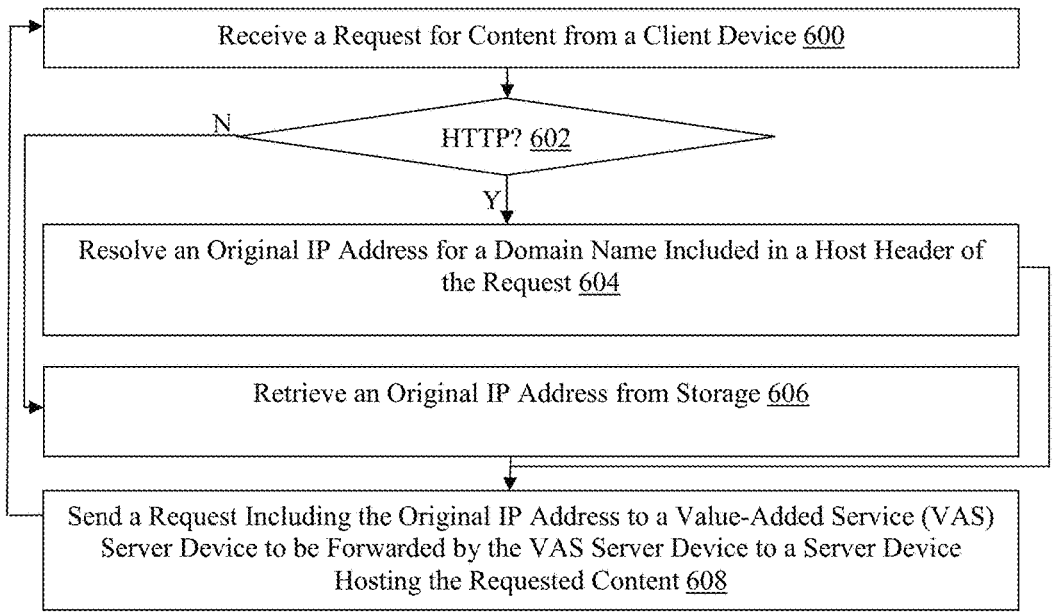
FIG. 6 is a flowchart of an exemplary method for processing client device requests with the exemplary steering endpoint device.

Referring more specifically to FIG. 6, an exemplary method for processing client device requests with the steering endpoint device 16 will now be described. In step 600 in this example, the steering endpoint device 16 receives a request for content from one of the client devices 20(1)-20(n). A request for content received from one of the client devices 20(1)-20(n) by the steering endpoint device 16 will have been sent by the one of the client devices 20(1)-20(n) after receiving a steering endpoint IP address in response to a request to resolve a domain name, as described and illustrated in more detail earlier with reference to step 504 of FIG. 5. Accordingly, the request received in step 600 is for content at a location associated with a domain name for which the confidence threshold has been exceeded. Additionally, the request can optionally be received by a virtual server hosted by the steering endpoint device 16 and one or more of the steps described and illustrated with reference to FIG. 6 can be performed by the virtual server.

In step 602, the steering endpoint device 16 determines whether the request is an HTTP request. If the steering endpoint device 16 determines that the request is an HTTP request, then the Yes branch is taken to step 604. In step 604, the steering endpoint device 16 resolves an original IP address for a domain name included in a host header of the request. The original IP address can be resolved by communicating with the local DNS server device 14 or another DNS server device, by way of example only, although other methods of resolving the original IP address can also be used.

Referring back to step 602, if the steering endpoint device 16 determines that the request is not an HTTP request, then the No branch is taken to step 606. In step 606, the steering endpoint device 16 retrieves an original IP address from local storage. The retrieved original IP address could have been sent to the steering endpoint device 16 by the traffic manager computing device 12, as described and illustrated earlier with reference to step 424 of FIG. 4, by way of example only.

Irrespective of whether the steering endpoint device 16 resolves or retrieves the original IP address in step 604 or 606, respectively, the steering endpoint device 16 proceeds to step 608. In step 608, the steering endpoint device 16 sends a request including the original IP address to the VAS server device 18 to be forwarded by the VAS server device 18 to one of the server devices 24(1)-24(n) hosting the requested content. The VAS server device 18 can forward the request to the appropriate one of the server devices 24(1)-24(n) using the original IP address. By sending the request through the VAS server device 18, the one of the server devices 24(1)-24(n) will respond to the VAS server device 18 with the content, as described and illustrated in more detail later. Subsequent to sending the request, the steering endpoint device 16 can proceed back to step 600 and receive another request for content from one of the client devices 20(1)-20(n).

Figure 7:
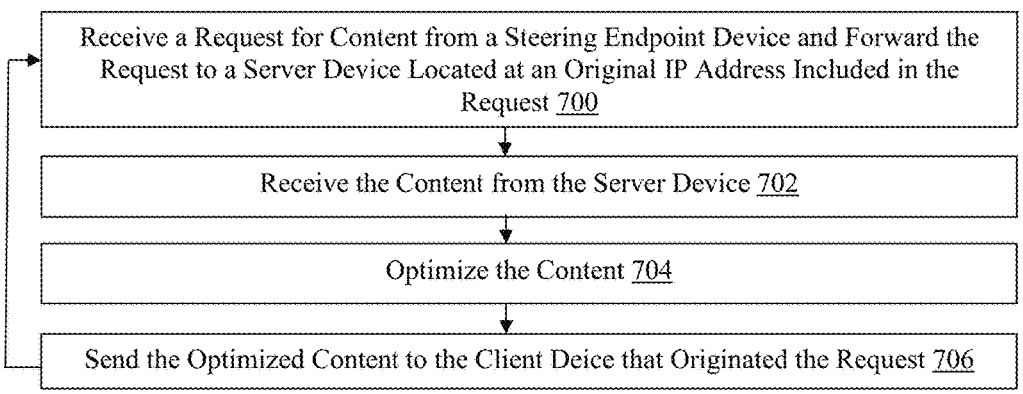
FIG. 7 is a flowchart of an exemplary method for processing client device requests with the exemplary VAS server device.

Referring more specifically to FIG. 7, an exemplary method for processing client device requests with the VAS server device 18 will now be described. In step 700 in this example, the VAS server device 18 receives a request for content from the steering endpoint device 16 and forwards the request to one of the server devices 24(1)-24(n) located at an original IP address included in the received request. The request can be sent by the steering endpoint device 16, as described and illustrated earlier with reference to step 608 of FIG. 6, by way of example only.

In step 702, the VAS server device 18 can receive the content from the one of the server devices 24(1)-24(n) as sent in response to the forwarded request. In step 704, the VAS server device 18 can optimize the content. By way of example only, the VAS server device 18 can optimize video files for communication through the provider network 26 and the access network 22 to the requesting one of the client devices 20(1)-20(n), although other types of content can also be optimized and the VAS server device 18 can process the content in other ways. In step 706, the VAS server device 18 sends the optimized content to the requesting one of the client devices 20(1)-20(n). Accordingly, request traffic in this example can advantageously be steered through the VAS server device 18, and content sent in response can be optimized, subsequent to the traffic manager computing device 12 determining that a confidence threshold has been exceeded for the domain name associated with the content.

Figure 8:
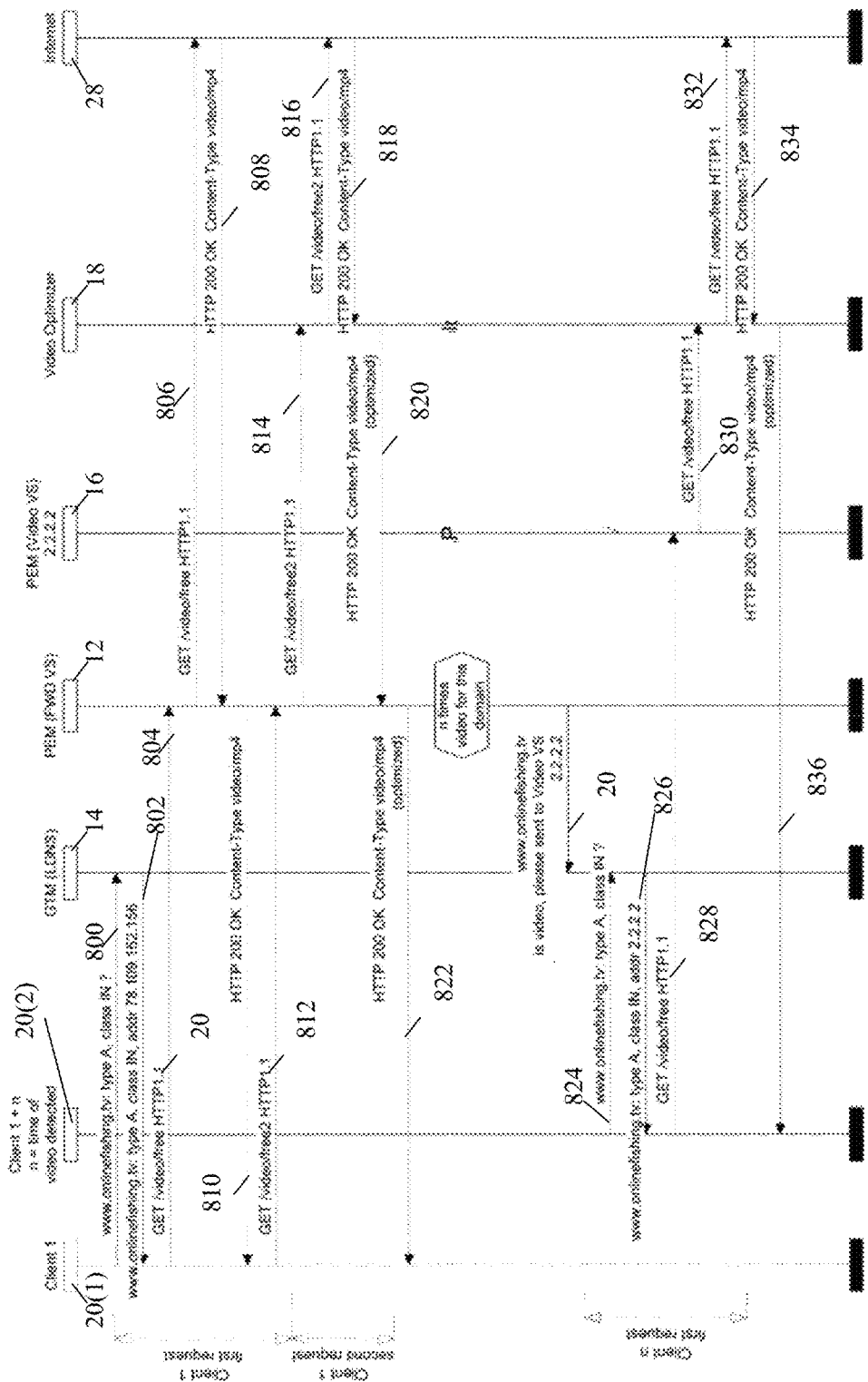
FIG. 8 is a timing diagram illustrating an exemplary method for network traffic presteering.

Referring more specifically to FIG. 8, a timing diagram illustrating an exemplary method for network traffic presteering will now be described. In step 800 in this example, a client device 20(1) (referred to as "Client 1" in this example) sends a request to the local DNS server device 14 (referred to as "GTM (LDNS)" in this example), optionally through the traffic manager computing device 12 (referred to as "PEM (FWD VS)" in this example), to resolve a domain name ("www.onlinefishing.tv" in this example). In step 802, the local DNS server 14 returns an original IP address ("78.109.162.156" in this example) to the client device 20(1).

In step 804, the client device 20(1) sends a request for content at a location ("/video/free" in this example) associated with the domain name to the traffic manager computing device 12. In this example, the request is an HTTP GET request, although other types of requests associated with other protocols can also be used. In step 806, the traffic manager computing device 12 forwards the request for content to the Internet 28 and one of the server devices 24(1)-24(n) (not shown) located at the original IP address included in the request for content.

In step 808, the traffic manager computing device 12 receives a response from the Internet 28, and the one of the server devices 24(1)-24(n), which includes the content and an indication of the content type ("video/mp4" in this example). In step 810, the traffic manager computing device 12 determines and stores classification information in an entry of the classification information table 40 for the domain name based on the information included in the response and forwards the response with the requested content to the client device 20(1).

In step 812, the client device 20(1) sends another request for content at a location ("/video/free2" in this example) associated with the domain name to the traffic manager computing device 12. Since the client device 20(1) previously resolved the original IP address for the domain name, the other request for content can be sent directly to the traffic manager computing device 12. In step 814, the traffic manager computing device 12 forwards the request for content directly to the VAS server device 18 (referred to as "Video Optimizer" in this example). Accordingly, in this example, the traffic manager computing device 12 also determined in step 810 that the domain name should be classified for the client device 20(1) as associated with video content based on the classification information indicating that video type content was retrieved from a location associated with the domain name one time by the client device 20(1).

In step 816, the VAS server device 18 forwards the request for content to the Internet 28 and one of the server devices 24(1)-24(n) associated with an original IP address included in the request for content. In step 818, the VAS server device 18 receives a response including the requested content from the Internet 28 and the one of the server devices 24(1)-24(n). In step 820, the VAS server device 18 optimizes the video content included in the response and sends the response with the optimized video content to the traffic manager computing device 12. In step 822, the traffic manager computing device 12 determines and stores classification information in the classification information table 40 based on the response and forwards the response with the optimized content to the client device 20(1).

In step 824, another client device 20(2) (referred to as "Client 1+n" in this example) sends a request to the local DNS server device 14 to resolve the same domain as included in the request sent in step 800 by the client device 20(1). In step 826, the local DNS server device 14 sends a steering endpoint IP address ("2.2.2.2" in this example) to the client device 20(2) in response.

Accordingly, the traffic manager computing device 12 previously determined, such as in step 822, by way of example only, or during any other sequence of servicing a request for the client device 20(1) or any number of other client devices for content at a location associated with the domain name, that the confidence threshold was exceeded and there was sufficient likelihood that content associated with the domain name is of the video type. Therefore, the traffic manager computing device 12 sent the steering endpoint IP address to the local DNS server device 14 so that the local DNS server device 14 would steer request traffic associated with the domain name to the steering endpoint device 16 (referred to as "(PEM (Video VS) 2.2.2.2" in this example).

In step 828, the client device 20(2) sends a request for content at a location ("/video/free" in this example) associated with the domain name to the steering endpoint IP address received in step 826, which is associated with the steering endpoint device 16. In step 830, the steering endpoint device 16, or a virtual server located at the steering endpoint IP address and hosted by the steering endpoint device 16, sends the request to the VAS server device 18. The request can be sent to an appropriate application hosted by the VAS server device 18 for processing or optimizing content of the type for which the domain name has been classified, and to which the request was sent as described and illustrated earlier with reference to step 814.

Additionally, the steering endpoint device 16 resolves the original IP address using the domain name included in the host header of the request since the request is an HTTP GET request in this example. In other examples in which the request is not an HTTP request, the steering endpoint device 16 can retrieve the original IP address from local storage as stored in response to receiving the original IP address from the traffic manager computing device 12 subsequent to the traffic manager computing device 12 determining the confidence threshold had been exceeded for the domain name.

In step 832, the VAS server device 18 inserts the resolved original IP address into the request and forwards the request to the Internet 28 and the one of the server devices 24(1)-24(n). In step 834, the one of the server devices 24(1)-24(n) and the Internet 28 sends a response including the requested content to the VAS server device 18. In step 836, the VAS server device 18 optimizes the video content and sends a response including the optimized content to the client device 20(2). Accordingly, the client device 20(2) is steered through the VAS server device 18 and receives optimized video content without ever having to receive video content that is not optimized since the content is at a location associated with a domain name for which the traffic manager computing device 12 previously determined a confidence threshold was exceeded and was likely to be associated with content of the video type.

Accordingly, with this technology, domain names can be classified as associated with content of a specified type based on a confidence threshold being exceeded. Using DNS, request traffic associated with the domain names from client devices sent subsequent to the confidence threshold being exceeded can then be presteered through VAS server device(s) so that the content can be optimized. Accordingly, the client devices receiving optimized content that is presteered can receive the content relatively quickly and in an optimized format. Advantageously, both HTTP and non-HTTP network traffic can be presteered through a highly scalable process.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for network traffic presteering to facilitate improved delivery of optimized content, the method implemented by a network traffic system comprising one or more traffic manager computing devices, Domain Name System (DNS) server devices, steering endpoint devices, value-added service (VAS) server devices, content server devices, or client devices, the method comprising:

retrieving, via at least one of one or more provider networks or one or more wide area networks, content from a server at a location associated with a domain name in response to a request for the content received via one or more access networks from a client;

determining classification data for the domain name, the classification data comprising at least a type of the retrieved content and a request volume for the type of the retrieved content;

determining when a confidence threshold has been reached based on the request volume for the type of the retrieved content in the classification data, the request volume corresponding to a number of received requests for content of the type of the retrieved content;

identifying a steering endpoint Internet Protocol (IP) address based on the type of the retrieved content;

sending at least the steering endpoint IP address and the domain name to a Domain Name System (DNS) server to facilitate resolution of the domain name in a DNS request from another client to the steering endpoint IP address, when the determining indicates that the confidence threshold has been reached, wherein a virtual server at the steering endpoint IP address is configured to identify a value-added service (VAS) server configured to optimize content of the type of the retrieved content; and sending the retrieved content to the client via the one or more access networks in response to the received request.

2. The method of claim 1, further comprising:
receiving another request from the client for content at the location associated with the domain name; and
sending the another request to the VAS server.

3. The method of claim 1, further comprising updating the request volume, wherein the request volume represents a number of times content of the type of the requested content has been retrieved from one or more locations associated with the domain name.

4. The method of claim 1, further comprising:
forwarding another DNS request to resolve the domain name from the client to the DNS server and a response from the DNS server including an original IP address corresponding to the domain name to the client; and
sending the original IP address to the virtual server located at the steering endpoint IP address when the request for the content is not a HyperText Transfer Protocol (HTTP) request.

5. The method of claim 1, wherein the confidence threshold corresponds to a likelihood that another received request associated with the domain will be for content of the type of the retrieved content.

6. A traffic manager computing device, comprising a memory comprising programmed instructions stored thereon and at least one processor configured to be capable of executing the stored programmed instructions to:

retrieve, via at least one of one or more provider networks or one or more wide area networks, content from a server at a location associated with a domain name in response to a request for the content received via one or more access networks from a client;

determine classification data for the domain name, the classification data comprising at least a type of the retrieved content and a request volume for the type of the retrieved content;

determine when a confidence threshold has been reached based on the request volume for the type of the retrieved content in the classification data, the request volume corresponding to a number of received requests for content of the type of the retrieved content;

identify a steering endpoint Internet Protocol (IP) address based on the type of the retrieved content;

send at least the steering endpoint IP address and the domain name to a Domain Name System (DNS) server to facilitate resolution of the domain name in a DNS request from another client to the steering endpoint IP address, when the determining indicates that the confidence threshold has been reached, wherein a virtual server at the steering endpoint IP address is configured to identify a value-added service (VAS) server configured to optimize content of the type of the retrieved content; and send the retrieved content to the client via the one or more access networks in response to the received request.

7. The traffic manager computing device of claim 6, wherein the at least one processor is further configured to be capable of executing the stored programmed instructions to:
receive another request from the client for content at the location associated with the domain name; and
send the another request to the VAS server.

8. The traffic manager computing device of claim 6, wherein the at least one processor is further configured to be capable of executing the stored programmed instructions to updating the request volume, wherein the volume represents a number of times content of the type of the requested content has been retrieved from one or more locations associated with the domain name.

9. The traffic manager computing device of claim 6, wherein the at least one processor is further configured to be capable of executing the stored programmed instructions to:
forward another DNS request to resolve the domain name from the client to the DNS server and a response from the DNS server including an original IP address corresponding to the domain name to the client; and
send the original IP address to the virtual server located at the steering endpoint IP address when the request for the content is not a HyperText Transfer Protocol (HTTP) request.

10. The traffic manager computing device of claim 6, wherein the confidence threshold corresponds to a likelihood that another received request associated with the domain will be for content of the type of the retrieved content.

11. A non-transitory computer readable medium having stored thereon instructions for network traffic presteering to facilitate improved delivery of optimized content comprising executable code which when executed by one or more processor, causes the one or more processors to:
retrieve, via at least one of one or more provider networks or one or more wide area networks, content from a server at a location associated with a domain name in response to a request for the content received via one or more access networks from a client;
determine classification data for the domain name, the classification data comprising at least a type of the retrieved content and a request volume for the type of the retrieved content;
determine when a confidence threshold has been reached based on the request volume for the type of the retrieved content in the classification data, the request volume corresponding to a number of received requests for content of the type of the retrieved content;
identify a steering endpoint Internet Protocol (IP) address based on the type of the retrieved content;
send at least the steering endpoint IP address and the domain name to a Domain Name System (DNS) server to facilitate resolution of the domain name in a DNS request from another client to the steering endpoint IP address, when the determining indicates that the confidence threshold has been reached, wherein a virtual server at the steering endpoint IP address is configured to identify a value-added service (VAS) server configured to optimize content of the type of the retrieved content; and
send the retrieved content to the client via the one or more access networks in response to the received request.

12. The non-transitory computer readable medium of claim 11, wherein the executable code when executed by the one or more processors further causes the one or more processors to:
receive another request from the client for content at the location associated with the domain name; and
send the another request to the VAS server.

13. The non-transitory computer readable medium of claim 11, wherein the executable code when executed by the one or more processors further causes the one or more processors to update the request volume, wherein the volume represents a number of times content of the type of the requested content has been retrieved from one or more locations associated with the domain name.

14. The non-transitory computer readable medium of claim 11, wherein the executable code when executed by the one or more processors further causes the one or more processors to:
forward another DNS request to resolve the domain name from the client to the DNS server and a response from the DNS server including an original IP address corresponding to the domain name to the client; and
send the original IP address to the virtual server located at the steering endpoint IP address when the request for the content is not a HyperText Transfer Protocol (HTTP) request.

15. The non-transitory computer readable medium of claim 11, wherein the confidence threshold corresponds to a likelihood that another received request associated with the domain will be for content of the type of the retrieved content.

16. A network traffic management system, comprising one or more traffic manager computing devices, Domain Name System (DNS) server devices, steering endpoint devices, value-added service (VAS) server devices, content server devices, or client devices, the network traffic management system comprising memory comprising programmed instructions stored thereon and one or more processors configured to be capable of executing the stored programmed instructions to:
retrieve, via at least one of one or more provider networks or one or more wide area networks, content from a server at a location associated with a domain name in response to a request for the content received via one or more access networks from a client;
determine classification data for the domain name, the classification data comprising at least a type of the retrieved content and a request volume for the type of the retrieved content;
determine when a confidence threshold has been reached based on the request volume for the type of the retrieved content in the classification data, the request volume corresponding to a number of received requests for content of the type of the retrieved content;
identify a steering endpoint Internet Protocol (IP) address based on the type of the retrieved content;
send at least the steering endpoint IP address and the domain name to a Domain Name System (DNS) server to facilitate resolution of the domain name in a DNS request from another client to the steering endpoint IP address, when the determining indicates that the confidence threshold has been reached, wherein a virtual server at the steering endpoint IP address is configured to identify a value-added service (VAS) server configured to optimize content of the type of the retrieved content; and send the retrieved content to the client via the one or more access networks in response to the received request.

17. The network traffic management system of claim 16, wherein the one or more processors are further configured to be capable of executing the stored programmed instructions to:
receive another request from the client for content at the location associated with the domain name; and
send the another request to the VAS server.

18. The network traffic management system of claim 16, wherein the one or more processors are further configured to be capable of executing the stored programmed instructions to update the request volume, wherein the volume represents a number of times content of the type of the requested content has been retrieved from one or more locations associated with the domain name.

19. The network traffic management system of claim 16, wherein the one or more processors are further configured to be capable of executing the stored programmed instructions to:
forward another DNS request to resolve the domain name from the client to the DNS server and a response from the DNS server including an original IP address corresponding to the domain name to the client; and
send the original IP address to the virtual server located at the steering endpoint IP address when the request for the content is not a HyperText Transfer Protocol (HTTP) request.

20. The network traffic management system of claim 16, wherein the confidence threshold corresponds to a likelihood that another received request associated with the domain will be for content of the type of the retrieved content.

* * * * *